United States Patent [19]

Aulich et al.

[11] Patent Number: 4,971,772
[45] Date of Patent: Nov. 20, 1990

[54] HIGH-PURITY LINING FOR AN ELECTRIC LOW SHAFT FURNACE

[75] Inventors: Hubert Aulich, Munich; Friedrich-Wilhelm Schulze, Eching am Ammersee; Benedikt Strake, Munich, all of Fed. Rep. of Germany

[73] Assignee: Siemens Aktiengesellschaft, Berlin and Munich, Fed. Rep. of Germany

[21] Appl. No.: 485,758

[22] Filed: Feb. 26, 1990

Related U.S. Application Data

[63] Continuation of Ser. No. 236,845, Aug. 26, 1988, abandoned.

[30] Foreign Application Priority Data

Sep. 23, 1987 [DE] Fed. Rep. of Germany ....... 3732073

[51] Int. Cl.$^5$ .................... F27B 14/08; F27B 14/06; F27B 14/10
[52] U.S. Cl. ................................ 422/241; 422/240; 422/248; 432/262; 432/264; 432/265
[58] Field of Search ............... 422/240, 241, 199, 248; 432/262, 264, 265; 423/350

[56] References Cited

U.S. PATENT DOCUMENTS

| | | | |
|---|---|---|---|
| 3,227,431 | 1/1966 | Steeves | 432/264 |
| 4,247,528 | 1/1981 | Dosaj et al. | 423/350 |
| 4,262,039 | 4/1981 | Gyarmati et al. | 427/249 X |
| 4,390,504 | 6/1983 | Enomoto et al. | 422/199 X |
| 4,460,556 | 7/1984 | Aulich et al. | 423/350 |
| 4,528,667 | 7/1985 | Aulich et al. | 371/55 |
| 4,820,341 | 4/1989 | Lask et al. | 423/350 X |

FOREIGN PATENT DOCUMENTS 3215081 3/1983 Fed. Rep. of Germany.

OTHER PUBLICATIONS

H. A. Aulich et al, Solar-Grade Silicon Prepared by Advanced Carbothermic Reduction of Silica, Siemens Forsch.—U. Entwickl.—Ber. Bd. 15 (1986), No. 4, Springer-Verlag, 1986, pp. 157–162.

Primary Examiner—Robert J. Hill, Jr.
Assistant Examiner—Amalia L. Santiago
Attorney, Agent, or Firm—Hill, Van Santen, Steadman & Simpson

[57] ABSTRACT

An inside lining for the reaction chamber of an electric low shaft furnace, particularly for producing high-purity silicon from silicon oxide by carbothermic reduction, is provided which has a melting crucible of dense graphite and a thermal insulation, whereby at least the floor of the reaction chamber has an inside lining of high-purity carbon. The inside lining is constructed from graphite, graphite grits or lampblack. The inside lining provides good thermal insulation and does not further contaminate the molten metal due to furnace materials. The inside lining prevents a loss of material in that seepage of molten metal into the insulation is prevented by a rapid dropoff of the temperature in the insulation below the melting point of the metal.

4 Claims, 1 Drawing Sheet

HIGH-PURITY LINING FOR AN ELECTRIC LOW SHAFT FURNACE

This is a continuation of application Ser. No. 236,845, filed Aug. 26, 1988, now abandoned.

BACKGROUND OF THE INVENTION

The present invention is directed to an inside lining for a reaction chamber of an electric low shaft furnace, having a graphite melting crucible and a thermal insulation, and in particular to such linings wherein high purity silicon is produced by carbothermic reduction.

Typically, high purity silicon is currently produced pursuant to the Siemens C-process. According to this process, metallurgical silicon manufactured by the reduction of silicon dioxide with carbon is converted into a volatile silicon halide compound, cleaned via the vapor phase, and again reduced to silicon with hydrogen. Although silicon produced through this process meets the high purity requirements needed for such uses as electronic silicon, it is to expensive for use in many other applications such as, for example, in photovoltaics.

A possible method for manufacturing solar cell silicon suitable for photovoltaic elements in a cost-beneficial way is described in an article by J. Grabmaier in Siemens Forschungsund Entwicklungsberichten, Vol. 15, 1986, pages 157 through 162. The method is based on pre-cleaned and high purity initial materials. High purity silicon dioxide is used that is obtained from glass fibers leached with hot mineral acid. High purity carbon, cleaned by leaching, is used for reduction. German published application No. 32 15 981, for example, discloses such a method.

Through the method, the pre-cleaned initial materials are reacted with one another in an arc furnace. The reaction of the pre-cleaned initial materials is based on what is referred to as the ACR process (advanced carbothermic reduction).

FIG. 1 illustrates schematically, a crossection of a known structure of an electric low shaft furnace that can be used to produce high-purity silicon. The structure essentially comprises a melting crucible 1 composed of high purity graphite or carbon, a discharge aperture 2 that is likewise lined, and a heat resistant thermal insulation 3. The thermal insulation is typically composed of refractory rock or of compounds based on silicon dioxide or, respectively aluminum oxide. A further carbon layer 4 is provided under the melting crucible for thermal insulation. A furnace jacket is provided formed by sheet steel 5.

One of the difficulties in making high-purity silicon using such a device is that it has been demonstrated that the melting crucible 1 cannot be made silicon tight. This is true even when a highly compressed graphite is used as the crucible material 1. This is due to the high seepability of the silicon melt. The silicon melt filters into the thinnest seams and enters into contact with the insulation material 3 therein. Typically, the insulation material has a high phosphorous content because binding agents containing phosphorous are used to manufacture the insulation material. When contacted with silicon, carbon, and carbonmonoxide in the furnace, the phosphorous is reduced out of the insulation material and is absorbed by the molten silicon. The silicon, which has become n-conductive due to the phosphorous content, is thereby rendered unsuitable for the manufacture of solar cells and must be cleaned of phosphorous. This is an involved process.

Problems identical to those found when phosphorous is used in the insulation material arise when almost any other element is present in the insulation material that can be reduced by the silicon melt. This is especially a problem when boron is present in that especially harmful contaminants arise from the boron. Boron, however, is contained in nearly all refractory materials. The subsequent removal of boron from the produced silicon is also extremely difficult.

Despite these problems, oxide ceramic materials for thermal insulation that exhibit an adequate purity, good insulating properties, and an adequate stability in a highly reducing furnace atmosphere are not commercially obtainable.

SUMMARY OF THE INVENTION

The present invention provides a high-purity lining for an electrical furnace, for an ACR process, that avoids the deficiencies set forth in the background of the invention, is cost-beneficial, and has good insulating properties at the same time.

To this end, the present invention provides an inside lining for a reaction chamber of an electric low shaft furnace, particularly for producing high-purity silicon from silicon oxide by carbothermic reduction, having a graphite melting crucible and thermal insulation, the floor of the reaction chamber includes an inside lining of high purity carbon.

In an embodiment, the thermal insulation is composed of graphite, graphite grits, or lampblack. These materials replace the prior standard ceramic oxide materials. These materials differ greatly in terms of their thermal conductivity, which decreases from graphite to graphite grits to lampblack. Accordingly, in an embodiment, a multilayer format of the furnace lining is provided.

In an embodiment, the inside lining is constructed from a high purity carbon that exhibits a boron content and phosphorous content each having a maximum of 0.05 ppmw and has an overall ash content of a maximum of 10 ppmw.

In an embodiment, the inside lining is situated only in the floor region of the reaction chamber and the remaining side walls of the furnace are coolable.

In an embodiment, the thermal insulation of high purity carbon is present in a plurality of different layers. In a preferred embodiment, the inside lining of the furnace has three layers that, from inside towards outside, are of the materials graphite, graphite grits, and lampblack.

In an embodiment, the graphite layer has a thickness that is such that, during operation of the furnace, the temperature therein decreases towards the outside from the interior operating temperature of the furnace down to below the melting point of the silicon.

In an embodiment, the side wall of the furnace is cooled and the thermally insulating lining of the side wall is eliminated.

Additional advantages and features of the present invention are described in, and will be apparent from, the detailed description of the presently preferred embodiments and the drawings.

DETAILED DESCRIPTION OF THE PRESENTLY PREFERRED EMBODIMENTS

The present invention provides an inside lining for the reaction chamber of an electric low shaft furnace, particularly for producing high-purity silicon from silicon oxide by carbothermic reduction having a graphite melting crucible and thermal insulation, at least the floor of the reaction chamber has an inside lining of high-purity carbon.

Figure 1:
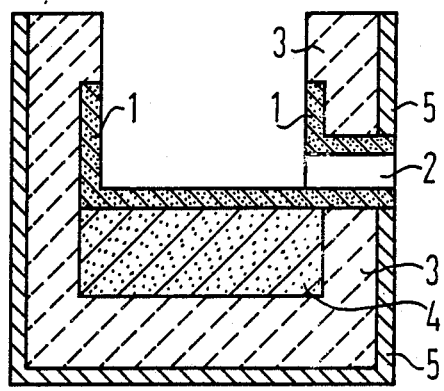
FIG. 1 illustrates, schematically, a cross section of a known electric low shaft furnace.
Figure 2:
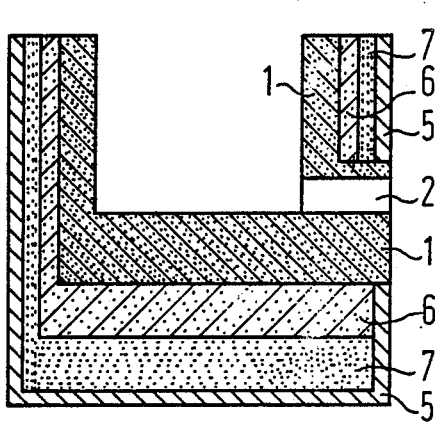
FIG. 2 illustrates, schematically, a cross section of an embodiment of the inside lining of a furnace according to the present invention.

Referring now to FIG. 2, a cross section of an embodiment of the inside lining of a furnace according to the present invention is illustrated. The structure includes an innermost layer 1 which should be as impenetrable as possible to the silicon melt, the innermost layer 1 is composed of electrographite blocks that exhibit an adequately high density. This functions to coat the silicon melt with a tight silicon carbon skin upon contact. When a porous graphite material is selected, a deeper penetration of the silicon into the porous graphite structure results and, as a consequence thereof, leads to a bursting of the structure due to the formation of silicon carbide. In addition to higher silicon losses, such a bursting of the structure also leads to a great graphite erosion.

A graphite grits layer 6 is provided as the next layer under the innermost layer 1. An outermost layer 7 is provided after the graphite grits layer 6. The outermost layer 7 can be composed of lampblack. The excellent thermal insulating properties of lampblack, contrast with the low mechanical stability of the lampblack, thus, the lampblack layer 7 is provided in an adequately thin manner or can be entirely omitted. By contrast, graphite grits 6, exhibit adequate stability and therefore, for example, can support the weight of an entire furnace fill as the thermal insulation of the floor of the melting crucible without losing its structure-induced, beneficial thermal insulation properties.

The thickness of the individual wall layers 1, 6, and 7 is determined in accordance with the desired thermal insulation. However, the temperature at the innermost graphite layer 1 should drop off to about 1350° C., i.e., below the melting point of silicon. This temperature drop off thereby avoids a deeper penetration of the silicon melt into the innermost graphite layer 1, up to the insulating layer 6 and 7, thus preserving the layers insulating effect and avoiding an undesired loss of silicon material.

The carbon materials are provided in such high purity that given an allowable content of a maximum of 0.05 ppmw each of boron and phosphorous and given an overall impurity or ash content of a maximum of 10 ppmw, no further contaminations of the molten metal, for example of the silicon in the ACR process, arises due to the furnace lining.

Figure 3:
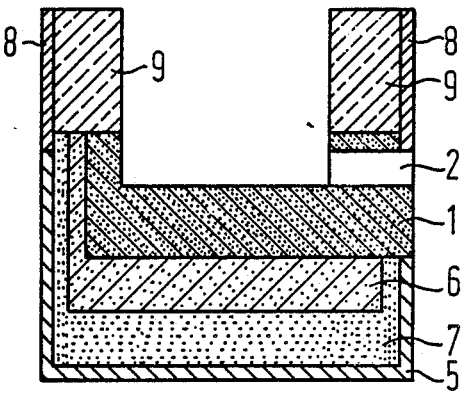
FIG. 3 illustrates, schematically, a cross section of another embodiment of the inside lining of a furnace according to the present invention.

In an embodiment of the present invention, illustrated in FIG. 3, the side walls of the furnace do not include an inside lining of thermally insulating material. Instead, the steel jacket forming the outer side wall 8 of the furnace can be cooled. In the melting process, the crucible wall is then formed by the utilized of batch materials 9 Specifically, the crucible wall is formed by the batch mixture of $SiO_2$ and a reduction agent for example, lampblack brikettes). This batch mixture 9 remains in a solid condition at the edge of the crucible and will "bake" further due to the condensation of the silicon oxide formed in the reduction process. The silicon oxide is still volatile at these temperatures and will, thus, further solidify.

In this embodiment, thermal losses that are slightly higher than those found in the embodiment having side wall insulation occur during operation. The slightly higher thermal losses occur because the heat is predominantly eliminated by the metal melt, in a downward direction. In this arrangement, however, the crucible floor is thermally well-insulated with the layers 1, 6, and 7.

Silicon produced by the ACR process in the electric low shaft furnace of the present invention exhibits improved purity compared to silicon produced in traditionally lined furnaces. Remaining impurities are now dependent on the educts of the reduction process. Silicon produced in a make-up, for example, exhibits p-conductivity given a boron content of below 1 ppmw and is not compensated. Solar cells manufactured therefrom achieve efficiencies of more than 11%.

Further, the furnace lining of the present invention provides good thermal insulation, is resistant to the smelt and operating conditions of the furnace and allows a continuous operation of the furnace over several years. The furnace is thereby designed not only for the production of high purity silicon but can also be used for all other metalurgical processes wherein high-purity metals are to be produced by reduction.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An electric shaft furnace, particularly for manufacturing high-purity silicon from silicon dioxide by carbothermic reduction comprising:

a reaction chamber having sidewalls, at least a bottom of the chamber having a thermal insulating lining, the thermal insulating lining being composed of an innermost layer and several additional different layers of high-purity carbon, the high-purity carbon layers being selected from the group consisting of graphite, graphite grit and carbon black/shoot; and said innermost layer of said thermal insulating lining defining a melting pot composed of graphite for receiving reactants in said reaction chamber.

2. The furnace of claim 1 wherein the high purity carbon has a boron content and phosphorous content each having a maximum of 0.05 ppmw and has an overall ash content of a maximum of 10 ppmw.

3. The furnace of claim 1 wherein the thermal insulating lining is present only in the bottom region of the reaction chamber, thereby rendering said sidewalls of the chamber and thereby excluding lining from the sidewalls of the reaction chamber coolable.

4. The furnace of claim 1 wherein the thermal insulating lining of the furnace has three layers that, from said innermost layer of the lining toward an outside layer of lining, are respectively constructed from graphite, graphite grits, and lampblack.

* * * * *